US011142112B1

(12) United States Patent
Cadwell

(10) Patent No.: US 11,142,112 B1
(45) Date of Patent: Oct. 12, 2021

(54) TRAILER MOUNTED LOG LOADER

(71) Applicant: Dustin R. Cadwell, Gunnison, CO (US)

(72) Inventor: Dustin R. Cadwell, Gunnison, CO (US)

( * ) Notice: Subject to any disclaimer, the term of this patent is extended or adjusted under 35 U.S.C. 154(b) by 0 days.

(21) Appl. No.: 17/228,599

(22) Filed: Apr. 12, 2021

Related U.S. Application Data

(60) Provisional application No. 63/008,659, filed on Apr. 11, 2020.

(51) Int. Cl.
*B60P 1/54* (2006.01)
*A01G 23/00* (2006.01)
*B60P 3/41* (2006.01)
*B66C 23/44* (2006.01)

(52) U.S. Cl.
CPC .......... *B60P 1/5428* (2013.01); *A01G 23/006* (2013.01); *B60P 3/41* (2013.01); *B66C 23/44* (2013.01)

(58) Field of Classification Search
CPC .... A01G 23/006; B60P 1/5428; B60P 1/5476; B60P 3/41; B66C 23/04; B66C 23/14; B66C 23/36; B66C 23/42; B66C 23/44; B66C 23/54; B66C 23/702
USPC ............................................. 254/324; 414/23
See application file for complete search history.

(56) References Cited

U.S. PATENT DOCUMENTS

| 3,115,256 | A | * | 12/1963 | Sears, Sr. | .................. | B60P 3/41 |
| | | | | | | 414/23 |
| 3,247,987 | A | * | 4/1966 | Lake | ......................... | B60P 3/41 |
| | | | | | | 414/732 |
| 3,613,918 | A | * | 10/1971 | Kruschke | .............. | B60P 1/5428 |
| | | | | | | 414/542 |
| 3,638,804 | A | * | 2/1972 | Blakeway | ............. | B60P 1/5428 |
| | | | | | | 212/285 |
| 3,980,276 | A | * | 9/1976 | Burkland | .............. | B60P 1/5476 |
| | | | | | | 254/415 |
| 5,419,672 | A | * | 5/1995 | Poe | ........................ | B60P 1/5428 |
| | | | | | | 414/462 |
| 6,921,241 | B2 | | 7/2005 | Rogers | | |
| 7,300,238 | B1 | * | 11/2007 | James | ..................... | B66C 23/44 |
| | | | | | | 414/540 |
| 7,547,180 | B2 | | 6/2009 | Nye | | |
| 7,568,876 | B1 | | 8/2009 | Tenney | | |
| 8,444,361 | B1 | | 5/2013 | Hershey | | |

(Continued)

*Primary Examiner* — James Keenan
(74) *Attorney, Agent, or Firm* — Christopher Mayle; Bold IP, PLLC

(57) ABSTRACT

Embodiments for a trailer mounted log loader are described. The trailer mounted log loader includes an A-frame made of square beams which have a connection plate attached at one end forming an apex of the A-frame. A hollow connection adapter is positioned between and connected to the connection plates of the A-frame. An extendable boom arm is situated within the hollow connection adapter. The extendable boom arm has an attachment point at a distal end opposite from the hollow connection adapter where an attachable attachment is connectable to the extendable boom arm. A pair of pivot arms are connected to a base of the A-frame. The A-frame pivot arms are in turn pivotally connect to a pair of uprights . . . . The ability to remove the uprights from the support posts allows the trailer mounted log loader to be mounted to any trailer or truck bed or stored when not in use.

11 Claims, 4 Drawing Sheets

(56) References Cited

U.S. PATENT DOCUMENTS

| | | | | |
|---|---|---|---|---|
| 8,851,823 | B1 * | 10/2014 | Hallmon, Jr. | B66C 23/44 |
| | | | | 414/540 |
| 9,668,429 | B2 * | 6/2017 | Dixon | A01G 23/006 |
| 9,957,140 | B2 * | 5/2018 | Piacentino | B66C 23/44 |
| 2007/0104560 | A1 | 5/2007 | Hall | |

* cited by examiner

TRAILER MOUNTED LOG LOADER

CROSS-REFERENCE TO RELATED APPLICATIONS

This application is a non-provisional patent application which claims priority to U.S. Provisional Patent Application No. 63/008,659, which was filed on Apr. 11, 2020, which is incorporated by reference in their entirety.

FIELD OF THE DISCLOSURE

The present invention relates to the field of log handling, and more particularly to lifting and loading logs onto a trailer.

BACKGROUND

The log lifting arch is a piece of logging equipment used for lifting and loading logs onto a trailer. The lifting arch is typically comprised of a metal frame shaped into an arch that is mounted onto a trailer. The arch is mounted to the trailer such that the arch has the ability to rotate forward or backwards 180 degrees at a base of the arch with respect to the trailer. A chain/hook or combination thereof is attached to a center of the arch where it is thereby used to capture and secure a log or an object that is to be lifted. A separate winch is connected to the arch allowing the arch to be tilted in either direction.

The advantages of utilizing a pivoting arch is its ability to lift and pull in one motion, which is faster than dragging the log up a ramp. However, this can be an unsafe means for lifting and loading the log onto a trailer bed. Initially the arch is pivoted forward, down away from the trailer where the arch faces the ground and the log to be lifted. The chain/hook is connected to the log to secure the log during lifting. A winch is operated where the winch pulls the lifting arch backwards, away from ground, lifting the log in the process. In order to load the log onto the trailer, the winch continues to pull the lifting arch past a 90-degree orientation with the trailer. The lifting arch will continue to travel in this direction until gravity takes over, when the arch will eventually fall onto a trailer deck.

When the lifting arch is in freefall, there are no means in which to control its descent. Thus, the lifting arch has the tendency to slam down onto the trailer deck. Doing so repeatedly has the potential of causing damage to both the lifting arch and the trailer deck, as well as the potential for injuring a person should they happen to be in the vicinity of the lifting arch as the lifting arch falls. Given the inherent danger the lifting arch can cause when it falls to the deck, it would be desirable to provide an improved log loader. Additionally, it would be desirable for the log loader to be removable from the trailer to which the log loader is mounted to.

SUMMARY

According to one embodiment, one or more embodiments are provided below for a trailer mounted log loader. One of the purposes of the trailer mounted log loader as described in one or more non-limiting embodiments herein is to eliminate the danger of limited control associated with the use of traditional log lifting arches.

In one or more non-limiting embodiments, the trailer mounted log loader includes an A-frame. The A-frame includes square beams having one or more connection plate located at an end forming the apex of the A-frame. A hollow connection adapter is positioned between and connected to the connection plates of the A-frame. An extendable boom arm is situated within the hollow connection adapter. The extendable boom arm is extendable where it travels colinear with the A-frame through the hollow connection adapter. The extendable boom arm has an attachment point at a distal end opposite from the hollow connection adapter. An adaptable attachment can be attached to the extendable boom arm. In one or more non-limiting embodiments the adaptable attachment includes a fixed head with a pulley and U-bolt mount. In an alternate embodiment, the adaptable attachment includes a swivel head with a pulley and a U-bolt mount.

In one or more non-limiting embodiments, the extendable boom arm is extendable such that it provides additional length when the A-frame is lowered and additional height when the A-frame is raised. A working advantage of the extendable boom is that the extendable boom arm can be extended such that the adaptable attachment can be positioned over the center of gravity of a log or an object to be lifted. This is essential for properly lifting the log or object completely off of the ground. Once the log or object is lifted, it can be positioned before placing it into a trailer or truck bed versus simply lifting one end of the log or object and dragging it into the trailer or truck bed.

In one or more non-limiting embodiments, the adaptable attachment includes an embodiment wherein the adaptable attachment has a fixed head with pulley and a U-bolt mount. The fixed head with pulley allows a user to wrap a cable around the pulley wherein the cable is attached to a log or an object at one end and secured to a U-bolt connected to the U-bolt mount at the other end. This is ideal when the log or object is positioned directly below the extendable boom. In an alternate embodiment, the adaptable attachment has a swivel head with pulley and a U-bolt mount. The swivel head with pulley also allows a user to wrap a cable around the pulley wherein the cable is attached to a log or an object at one end and secured to a U-bolt connected to the U-bolt mount at the other end. An advantage of the swivel head is that the swivel head can rotate in either a clockwise or counterclockwise direction. The rotation of the swivel head is advantageous for use when the log or object to be picked up is located on a left side or a right side of center of the extendable boom arm to which the adaptable attachment is attached. The off-centered log to be picked up will eventually move to center when as the A-frame is raised and the log or object is lifted off of the ground.

In one or more non-limiting embodiments, a pair of pivot arms are connected to a base of the A-frame. The A-frame pivot arms are pivotally connected to a pair of uprights. A pivot point between the connection of the A-frame pivot arms and uprights allows the A-frame to rotate from 0 to approximately 90 degrees and back. The uprights slide vertically into a set of support ports permanently affixed to a trailer or truck bed the trailer mounted log loader mounts to. The support posts, via the uprights, support the A-frame when the trailer mounted log loader is mounted to the trailer or truck bed. The uprights are secured inside of the support posts utilizing a locking mechanism such as a hole and pin, or any other similar means. When the locking mechanism is released, the uprights can be slid out of the support posts thus removing the trailer mounted log loader from the trailer or truck bed where it then can be stored when not in use. The uprights allow the trailer mounted log loader to be mounted to any trailer or truck bed that has the matching support posts affixed to the trailer or truck bed. Thus, the combination of the uprights and support posts of the present invention, allow the trailer mounted log loader to be mounted to any trailer or truck bed.

In one or more non-limiting embodiments, the trailer mounted log loader includes a hydraulic system, wherein the hydraulic system includes hydraulic cylinders, hydraulic cylinder hoses, valves, and switches. The hydraulic cylinders are attached between the A-frame pivot arms and uprights near the pivot connection between the A-frame pivot arms and uprights. Activating the hydraulic cylinders will cause the A-frame to be raised from its initial parallel state with the trailer or lowered from a position approximately perpendicular with the trailer.

In one or more non-limiting embodiment, the trailer mounted log loader further includes a winch system, wherein the winch system includes a motor and a cable, chain, or similar. The cable, chain, or similar of the winch system is connected to a winch cable, chain, or similar attachment point on the A-frame. The winch system provides additional support when raising or lowering the A-frame.

In one or more non-limiting embodiments, a remotely located control panel is connected to the hydraulic system. The control panel allows a user to operate the present invention, wherein the A-frame can be raised at a controlled rate to completely lift the log or object and then lower the log or object into the trailer or truck bed. Once the log or object has been connected to the A-frame to be placed within the trailer or truck bed, the A-frame can then be raised and lowered at a controlled rate. The ability to control the movement of the A-frame when lifting logs enables the trailer mounted log loader to be a safer means versus traditional log lifting arches whereby the log is pulled and dragged onto the trailer or truck bed. Using conventional methods, the traditional log lifting arches have the ability to fall and slam into the trailer or truck bed once the log has been placed onto the deck of the trailer or truck bed, which means the falling lifting arch has the potential to cause a great deal of damage to the arch, trailer, or truck bed, or injure an individual should they be in the vicinity of the log lifting arch. The one or more non-limiting embodiments for a trailer mounted log loader may help eliminate the drawbacks of such existing systems and ensure the safety of individuals and property involved in such operations.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
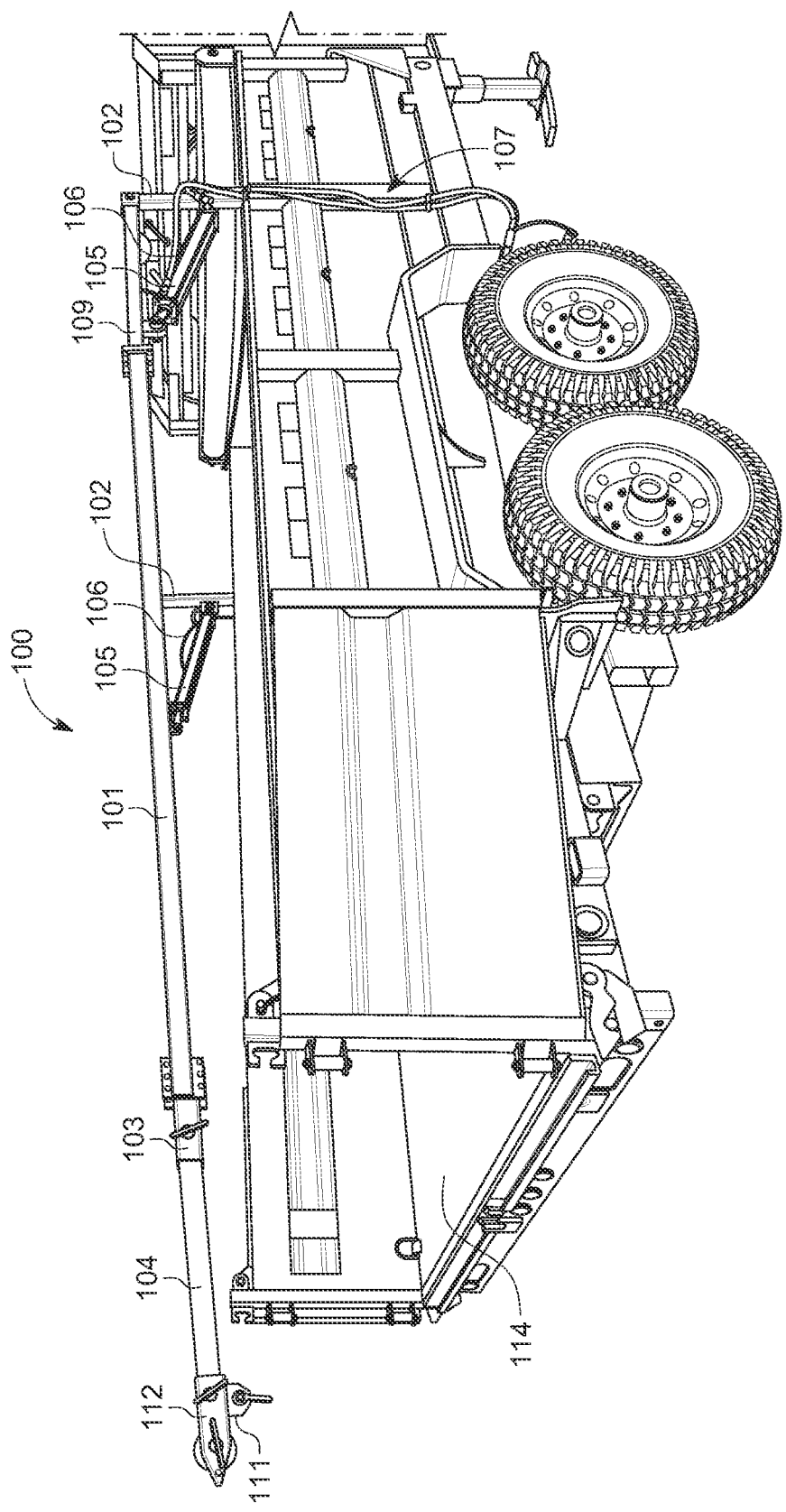
FIG. 1 is a pictorial illustration of an exemplary embodiment of a trailer mounted log loader.

In the Summary above and in this Detailed Description, and the Claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises", and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Certain terminology and derivations thereof may be used in the following description for convenience in reference only and will not be limiting. For example, words such as "front", "back", "right," and "left" would refer to directions in the drawings to which reference is made unless otherwise stated. References in the singular tense include the plural, and vice versa, unless otherwise noted.

The present description includes one or more non-limiting embodiments for a trailer mounted log loader. In one or more non-limiting embodiments, the trailer mounted log loader enables a user to lift and load logs or any other objects onto a trailer or truck bed. An A-frame forms the structure used to lift the logs or objects. The A-frame consists of a pair of square beams made of a rigid material, such as steel, or any other hardened metal or composite thereof A connection plate is attached to each of the square beams forming an apex of the A-frame. A pair of pivot arms are connected to a base of the A-frame. Together the A-frame and pivot arms are connected to a pair of uprights. A pivot connection between the A-frame pivot arms and the uprights allows the A-frame to rotate from an initial flat position, where the A-frame is parallel to the trailer or truck bed, to an upright position, where the A-frame is approximately at a right angle with respect to the trailer or truck bed.

The uprights provide a means for removing the trailer mounted log loader from the trailer or truck bed, where the trailer mounted log loader can be stored when not in use. The uprights consist of square beams made of a rigid material, such as steel, or any other hardened metal or composite thereof. A set of hollow support posts are permanently affixed to the trailer or truck bed. The uprights slide vertically into the support post. The support posts are and function as support structures for the trailer mounted log loader while it is mounted to the trailer or truck bed. The support posts are also made of a rigid material, such as steel, or any other hardened metal or composite thereof. A locking mechanism such as a hole and pin, or similar is used to secure the uprights within the support posts. When the locking mechanism is released, the uprights can be slid out of the support posts thus removing the trailer mounted log loader from the trailer or truck bed where it then can be stored when not in use. The uprights allow the trailer mounted log loader to be mounted to any trailer or truck bed that has the matching support posts affixed to the trailer or truck bed. Thus, the combination of the uprights and support posts of the present invention, allow the trailer mounted log loader to be mounted to any trailer or truck bed.

A hollow connection adapter is connected to the connection plates of the A-frame. The hollow connection adapter is comprised of a square tube made of a rigid material, such as steel, or any other hardened metal or composite thereof. The two connection plates of the A-frame are mechanically connected to the hollow connection adapter by nuts and bolts, screws, and so on. The connection plates are positioned on parallel sides of the hollow connection adapter. An extendable boom arm is situated within the hollow connection adapter. The extendable boom arm is capable of movement colinear to the A-frame. The extendable boom arm is also made of a rigid material, such as steel, or any other hardened metal or composite thereof. The extendable boom arm has two ends, whereby at a distal end of the extendable boom arm, opposite of the hollow connection adapter where the extendable boom arm is inserted, is an attachment point for an adaptable attachment. In one or more non-limiting embodiments, the adaptable attachment is comprised of a fixed head with a pulley and a U-bolt mount. In an alternate embodiment, the adaptable attachment is comprised of a swivel head with a pulley and a U-bolt mount. The adaptable attachment is attached to the extendable boom arm using a locking mechanism such as a hole and pin, or similar. The extendable boom arm can travel linearly along the A-frame where the extendable boom arm extends outward away from the hollow connection adapter so as to provide additional length when the A-frame is lowered and additional height when the A-frame is raised. A locking mechanism such as a hole and pin, or similar is used to secure the extendable boom arm at a desired length. Extending the extendable boom arm allows for the adaptable attachment, attached at the distal end of the extendable boom arm, to be positioned over the center of gravity of the log or object to be lifted. This is essential for properly lifting the log or object completely off of the ground and for controlling positioning of the log or object as the log or object is lifted.

In one or more non-limiting embodiments, a hydraulic system is utilized to raise and lower the A-frame of the present invention. The hydraulic system is comprised of hydraulic cylinders and hydraulic cylinder hoses. The hydraulic cylinders are mechanically mounted between the A-frame pivot arms and the uprights near the pivot connection between the A-frame pivot arms and uprights. Activating the hydraulic cylinders will cause the A-frame to be raised from an initial flat state, parallel to the trailer or truck bed, to a position approximately perpendicular with the trailer or truck bed, in a controlled manner. A separately located control panel is connected to the hydraulic system. The control panel includes valves and switches and uses hoses to connect to the hydraulic system. The control panel allows a user to remotely operate the A-frame. In one or more non-limiting embodiments, the control panel is located on the trailer or truck bed, away from the A-frame.

In one or more non-limiting embodiments, a winch system is utilized in conjunction with the A-frame to lift and load a log or an object into the trailer or truck bed. The winch system includes a motor and a cable, chain, or similar. The winch is separately mounted away from the A-frame. The winch cable, chain, or similar is extended from the winch along the A-frame to the pulley of the adaptable attachment attached to the distal end of the extendable boom arm. The winch cable, chain, or similar runs over the pulley and down to the log or object to be lifted. The hydraulic system is utilized to raise and lower the A-frame and the extendable boom arm is extended when applicable to be positioned over the center of gravity of the log or object to be lifted. The winch is activated to lower the cable, chain, or similar away from the pulley where the cable, chain, or similar is connected by an attachment method to the log or object to be lifted. The log or object is lifted from the ground by activating the winch. The attached log or object is then raised by the A-frame to be positioned over the trailer or truck bed. The winch is activated to lower the log or object into the trailer or truck bed.

In an alternate embodiment, a winch system is additionally utilized in addition to the hydraulic system to raise and lower the A-frame of the trailer mounted log loader. The winch system includes a motor and a cable, chain, or similar and is separately mounted away from the A-frame. It is connected to the A-frame via a cable, chain or similar to a winch cable, chain, or similar attach point on the A-frame. Activating the winch motor will act to raise or lower the A-frame in a controlled manner.

The presently described trailer mounted log loader may be used in any logging situation requiring logs or objects to be lifted and loaded onto a trailer or truck bed. Accordingly, the trailer mounted log loader can be used in situations where it is required to move and transport items from their given location to another including, but not limited, the woods or a residential location or any other type of location. Given the utility of the A-frame for lifting logs and other objects, the trailer mounted log loader can utilize a hydraulic system, a winch system, or both to operate the A-frame depending on the burden and complexity of the load to be lifted.

Figure 2:
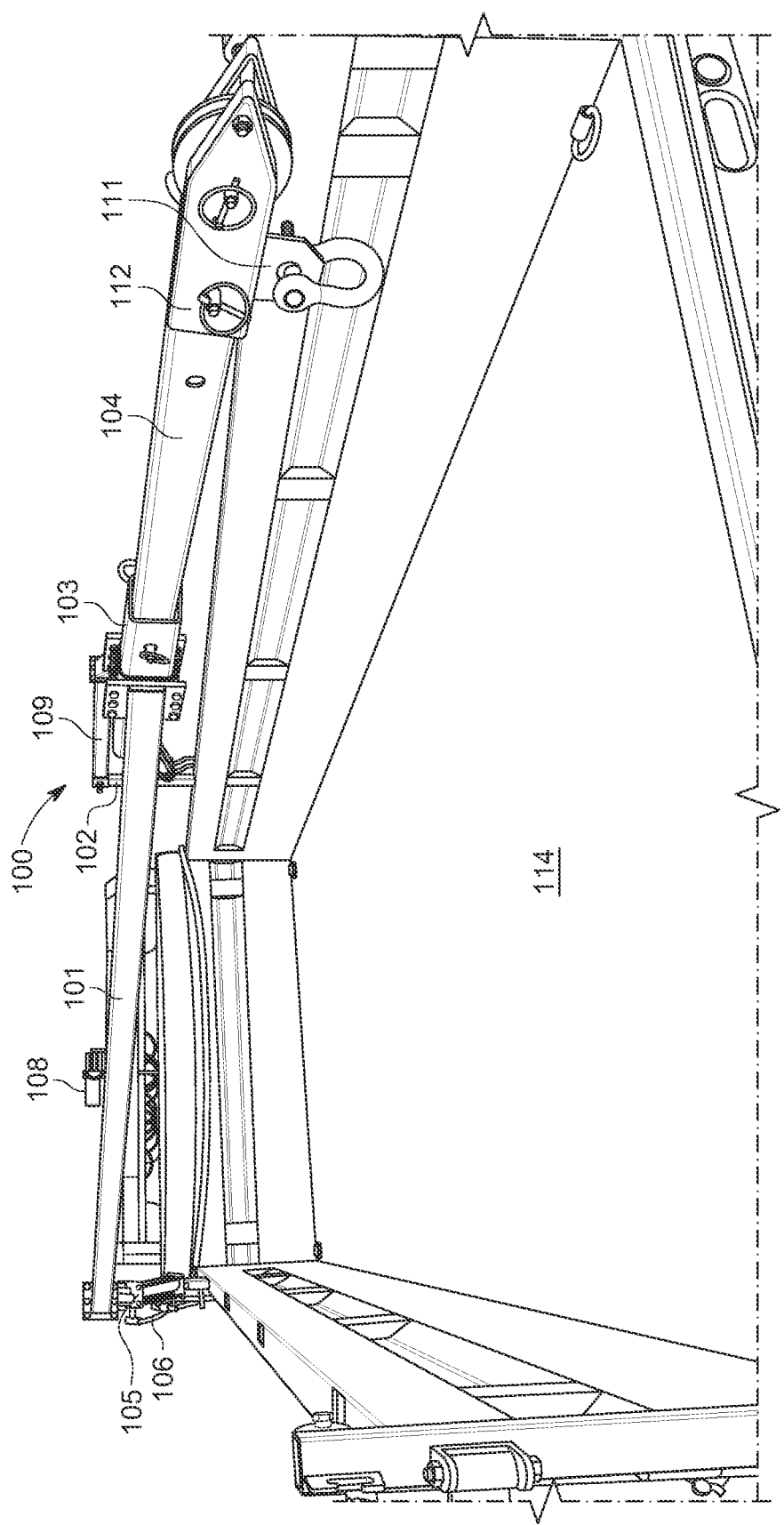
FIG. 2 is a pictorial illustration of an exemplary embodiment of a trailer mounted log loader.

FIGS. 1-4 are pictorial illustrations of a trailer mounted log loader according to one non-limiting embodiment. FIG. 1 and FIG. 2 show an example of the trailer mounted log loader 100. The trail mounted log loader 100 includes an A-frame 101. The A-frame 101 is comprised of square beams made of a rigid material, such as steel, or any other hardened metal or composite thereof. The A-frame 101 forms the lifting structure for which additional elements of the invention are attached. A connection plate is attached to each of the square beams of the A-frame 101 at an end forming an apex of the A-frame 101. A hollow connection adapter 103, as shown in FIG. 1, is positioned at the apex of the A-frame 101. The hollow connection adapter 103 is located between and connected to the connection plates of the A-frame 101.

Figure 4:
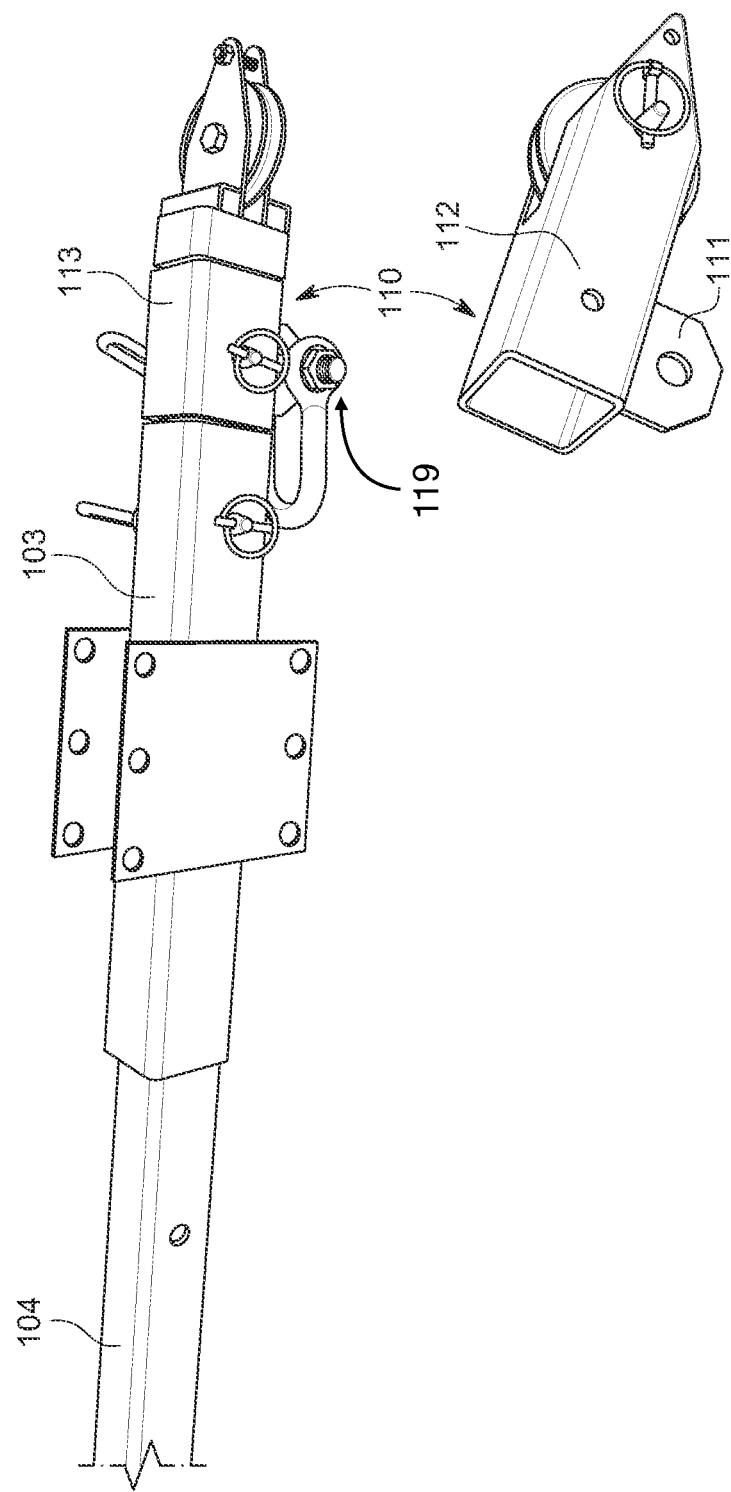
FIG. 4 is a pictorial illustration of an adaptable attachment component of a trailer mounted log loader.

In one or more embodiments, an extendable boom arm 104 is situated within the hollow connection adapter 103. The extendable boom arm 104 travels linearly along the A-frame 101 through the hollow connection adapter 103. A locking mechanism such as a hole and pin, or similar is used to secure the extendable boom arm 104 at a desired length. The extendable boom arm 104 includes two ends. A distal end of the extendable boom arm 104 opposite the hollow connection adapter 103 has an attachment point 119 wherein an adaptable attachment 110 (as shown in FIG. 4) can be attached to the extendable boom arm 104. In one or more non limiting embodiments, the adaptable attachment 110 includes a fixed head 112 with pulley and a U-bolt mount 111, as shown in FIG. 4. In an alternate embodiment, the adaptable attachment 110 includes a swivel head 113 with pulley and U-bolt mount 111 (as shown in FIG. 4). A locking mechanism such as a hole and pin, or similar is used to secure the adaptable attachment 110 to the extendable boom arm 104.

In one or more non-limiting embodiments, a pair of A-frame pivot arms 109 are connected to a base of the A-frame 101. The A-frame pivot arms 109 are pivotally connected to a pair of uprights 102 at a base of the A-frame pivot arms 109. A set of hollow support posts 107, as shown in FIG. 1, are permanently affixed to a trailer or truck bed 114 (shown in FIGS. 1-3) to which the trailer mounted log loader 100 is mounted to. The uprights 102 are inserted into the hollow support posts 107. The uprights 102, support posts 107, A-frame pivot arms 109, hollow connection adapter 103, and extendable boom arm 104 are made of a rigid material, such as steel, or any other hardened metal or composite thereof.

In one or more non-limiting embodiments, the trailer mounted log loader 100 includes a hydraulic system. The hydraulic system includes a set of hydraulic cylinders 105 and hydraulic cylinder hoses 106. The hydraulic cylinders 105 are mechanically mounted between the A-frame pivot arms 109 and the uprights 102 near the pivot connection between the A-frame pivot arms 109 and uprights 102. In one or more non-limiting embodiments, a remotely located control panel (not shown) is connected to the hydraulic system. The control panel allows an operator to remotely control raising and lowering of the A-frame 101.

In one or more non-limiting embodiments, the trailer mounted log loader 100 additionally includes a winch 108 (as shown in FIG. 2) system. The winch 108 system includes a motor and a cable, chain, or similar and is separately mounted away from the A-frame 101. The winch 108 cable, chain, or similar is extended from the winch 108 along the A-frame 101 to the pulley of the adaptable attachment 110 attached to the distal end of the extendable boom arm 104. The winch 108 cable, chain, or similar runs over the pulley and down to the log or object to be lifted. In an alternate embodiment, the winch 108 system is connected to the A-frame 101 via the cable, chain or similar to a winch cable, chain, or similar attachment point on the A-frame 101. Activating the winch 108 motor will act to raise or lower the A-frame 101 in a controlled manner in order to lift and lower logs or objects safely into the trailer or truck bed 114.

Figure 3:
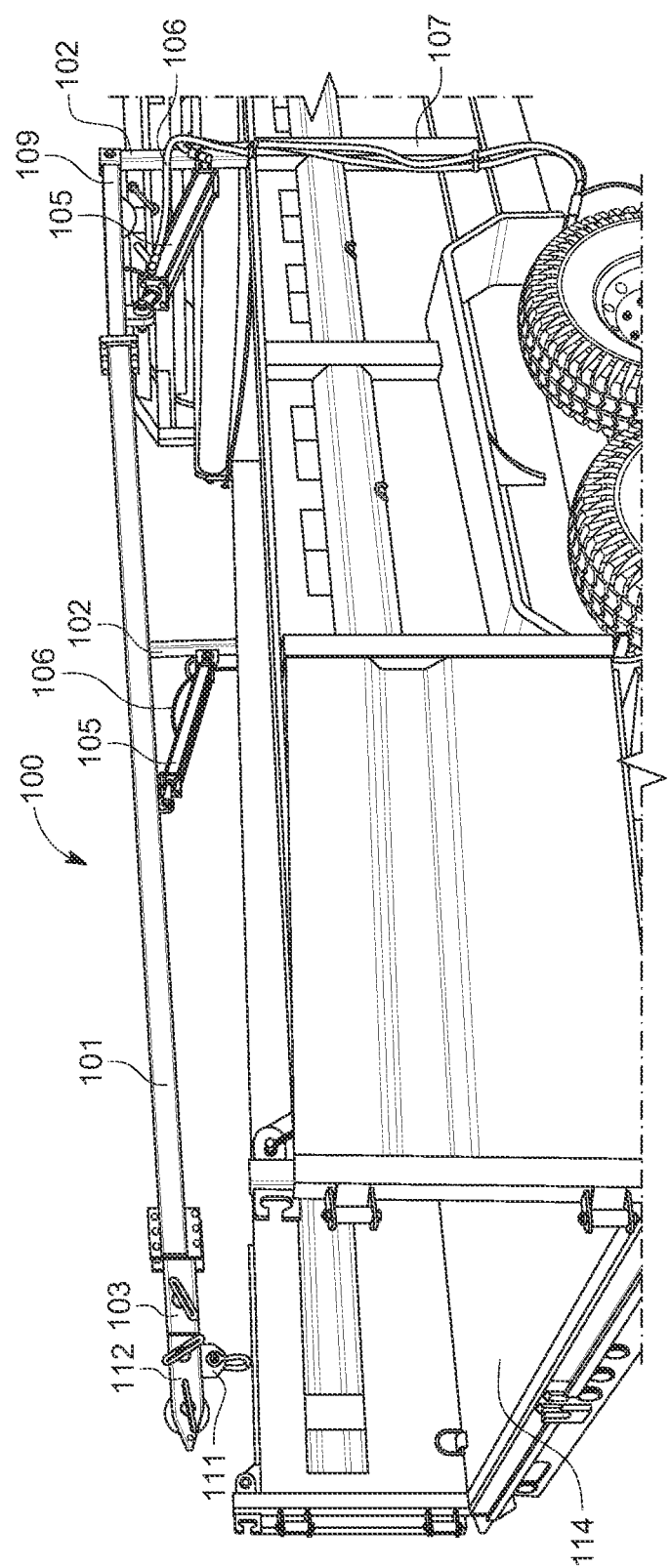
FIG. 3 is a pictorial illustration of an exemplary embodiment of a trailer mounted log loader.

Moving on to FIG. 3, FIG. 3 shows an example of the trailer mounted log loader 100 whereby the extendable boom arm 104 (shown in FIGS. 1 and 2) is retracted within the hollow connection adapter 103 and thus not visible within FIG. 3. Attached to the extendable boom arm 104 is the attachable adapter 110 wherein, the attachable adapter is comprised of a fixed head 112 with pulley and U-bolt mount. In an alternate embodiment, the adaptable attachment 110 includes a swivel head 113 with pulley and U-bolt mount 111 (as shown in FIG. 4). In FIG. 3 the extendable boom arm 104 is not visible because it is retracted within the hollow connection and is hidden by the A-frame 101 arms.

Referring now to FIG. 4, FIG. 4 shows an example of the adaptable attachment component of the trailer mounted log loader. The adaptable attachment 110 is attached to the extendable boom arm 104 situated within the hollow connection adapter 103. In one or more non-limiting embodiments, the adaptable attachment 110 includes a fixed head 112 with pulley and a U-bolt mount 111. This configuration is ideal when a log or an object is positioned directly below the extendable boom arm 104. In an alternate embodiment, the adaptable attachment 110 has a swivel head 113 with pulley and a U-bolt mount 111. An advantage of the swivel head with pulley 113 is that the swivel head can rotate in either a clockwise or counterclockwise direction. The rotation of the swivel head is advantageous for use when the log or object to be picked up is located on a left side or a right side of center of the extendable boom arm 104 to which the adaptable attachment 110 is attached. A locking mechanism such as a hole and pin, or similar is used to secure the adaptable attachment 110.

Many other advantages and benefits are offered by the trailer mounted log loader as described herein in one or more non-limiting embodiments. The trailer mounted log loader may provide a novel means for providing a safer means for lifting and loading a log or an object onto a trailer or truck bed. Additionally, the trailer mounted log loader provides a means for mounting and unmounting the trailer mounted log loader from a trailer or truck bed where the trailer mounted log loader can be stored for future use.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A trailer mounted log loader, comprising:
   an A-frame, wherein the A-frame is comprised of a first beam and a second beam wherein the first beam and the second beam each have at least one connection plate located at an apex of the A-frame;
   a hollow connection adapter, wherein the hollow connection adapter is positioned between the at least one connection plate of the first beam and the at least one connection plate of the second beam, and further wherein the hollow connection adapter is connected to the at least one connection plate of the first beam and the at least one connection plate of the second beam;
   at least one pivot arm, wherein the at least one pivot arm is connected to a base of the A-frame;
   at least one upright pivotally connected to the at least one pivot arm;
   at least one hollow support post, wherein the at least one hollow support post accepts the at least one upright and provides support to the A-frame;
   an extendable boom arm, wherein the extendable boom arm is situated within the hollow connection adapter and capable of linear travel along the A-frame through the hollow connection adapter, and further wherein the extendable boom arm has an attachment point located at a distal end of the extendable boom arm; and
   a hydraulic system, wherein the hydraulic system is comprised of a hydraulic cylinder and a hydraulic cylinder hose.

2. The trailer mounted log loader of claim 1, wherein an adaptable attachment is attachable to the distal end of the extendable boom arm.

3. The trailer mounted log loader of claim 2, wherein the adaptable attachment is comprised of a fixed head with a pulley and a U-bolt mount.

4. The trailer mounted log loader of claim 2, wherein the adaptable attachment is comprised of a swivel head with a pulley and a U-bolt mount.

5. The trailer mounted log loader of claim 2, wherein the hydraulic cylinder of the hydraulic system is connected to the at least one pivot arm at one end of the hydraulic cylinder and connected to the at least one upright at a remaining end of the hydraulic cylinder.

6. The trailer mounted log loader of claim 5, wherein the trailer mounted log loader comprises a winch system, wherein the winch system is comprised of a motor and a cable or chain, the cable or chain extending from a winch along the A-frame to a pulley of the adaptable attachment attached to the distal end of the extendable boom arm, further wherein the cable or chain runs over the pulley and down to a log or an object to be lifted.

7. A trailer mounted log loader comprising:
an A-frame, wherein the A-frame is comprised of square beams, further wherein each of the square beams has a connection plate located at an apex of the A-frame;
a hollow connection adapter, wherein the hollow connection adapter is positioned between the connection plates of the A-frame, and further wherein the hollow connection adapter is connected to the connection plates of the A-frame;
a pair of pivot arms, wherein the pair of pivot arms are connected to a base of the A-frame;
a pair of uprights pivotally connected to the pair of pivot arms;
a pair of hollow support posts, wherein the pair of hollow support posts accepts the pair of uprights and provides support to the A-frame;
an extendable boom arm, wherein the extendable boom arm is situated within the hollow connection adapter and capable of linear travel along the A-frame through the hollow connection adapter, and further wherein the extendable boom arm has an attachment point located at a distal end of the extendable boom arm;
a hydraulic system, wherein the hydraulic system is comprised of one or more hydraulic cylinders and one or more hydraulic cylinder hoses; and
a winch system, wherein the winch system is comprised of a motor and a cable or chain, the cable or chain extending from a winch along the A-frame to a pulley of an adaptable attachment attached to the distal end of the extendable boom arm, further wherein the cable or chain runs over the pulley and down to a log or an object to be lifted.

8. The trailer mounted log loader of claim 7, wherein the adaptable attachment is comprised of a fixed head.

9. The trailer mounted log loader of claim 7, wherein the adaptable attachment is comprised of a swivel head.

10. The trailer mounted log loader of claim 7, wherein the hydraulic cylinders of the hydraulic system are connected to the pair of pivot arms at one end of the hydraulic cylinders and connected to the pair of uprights at a remaining end of the hydraulic cylinders.

11. A trailer mounted log loader comprising:
an A-frame, wherein the A-frame is comprised of two beams, further wherein each beam has a connection plate located at an apex of the A-frame;
a hollow connection adapter, wherein the hollow connection adapter is positioned between the connection plates of the two beams and further wherein the hollow connection adapter is connected to the connection plates of two beams;
a pair of pivot arms, wherein the pivot arms are connected to a base of the A-frame;
a pair of uprights pivotally connected to the pivot arms;
a pair of hollow posts, wherein the pair of hollow posts accepts the pair of uprights and provides support to the A-frame;
an extendable boom arm, wherein the extendable boom arm is situated within the hollow connection adapter and capable of linear travel along the A-frame through the hollow connection adapter, and further wherein the extendable boom arm has an attachment point located at a distal end of the extendable boom arm;
a winch system, wherein the winch system is comprised of a motor and a cable or chain; and
a hydraulic system, wherein the hydraulic system is comprised of one or more hydraulic cylinders.

* * * * *